US012691870B2

(12) United States Patent
Zarringhalam et al.

(10) Patent No.: US 12,691,870 B2
(45) Date of Patent: Jul. 28, 2026

(54) PREDICTIVE FROZEN SCENE FOR UNINTERRUPTED OPERATION OF AUTOMATED EVASIVE MANEUVER SYSTEMS

(71) Applicant: GM GLOBAL TECHNOLOGY OPERATIONS LLC, Detroit, MI (US)

(72) Inventors: Reza Zarringhalam, Whitby (CA); Mohammadali Shahriari, Markham (CA); Milad Jalaliyazdi, Richmond Hill (CA); Dmitriy Feldman, W Bloomfield, MI (US); Assaad Krichene, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 18/666,045

(22) Filed: May 16, 2024

(65) Prior Publication Data

US 2025/0353489 A1     Nov. 20, 2025

(51) Int. Cl.
B60W 30/09     (2012.01)
B60W 40/06     (2012.01)

(52) U.S. Cl.
CPC ............ B60W 30/09 (2013.01); B60W 40/06 (2013.01); B60W 2420/403 (2013.01);
(Continued)

(58) Field of Classification Search
CPC ................. B60W 30/09; B60W 40/06; B60W 2420/403; B60W 2420/408; B60W 2554/20; B60W 2556/00; B60W 2552/53;

G06V 20/56; G06V 10/764; G06V 10/44; G06V 10/70; G06V 10/74; G06V 10/761; G06V 10/759; G06V 10/7715;
(Continued)

(56) References Cited

U.S. PATENT DOCUMENTS

| | | | |
|---|---|---|---|
| 10,719,083 B2 * | 7/2020 | Browning | .......... G01C 21/3841 |
| 2007/0043491 A1 * | 2/2007 | Goerick | ................. G06V 20/58 |
| | | | 701/41 |

(Continued)

FOREIGN PATENT DOCUMENTS

| | | |
|---|---|---|
| DE | 102006000640 A1 | 7/2007 |
| DE | 102013215100 A1 | 2/2015 |

*Primary Examiner* — Fadey S. Jabr
*Assistant Examiner* — Faris Asim Shaikh
(74) *Attorney, Agent, or Firm* — Ingrassia Fisher & Lorenz, LLP | IF&L

(57) ABSTRACT

A vehicle control system including a sensor for detecting an object location, a memory for storing an environment map indicative of a driving environment coordinated with a host vehicle location, a processor configured to estimate a line and object quality, to determine an uncertainty in response to historical motion of the objects, to detect a loss of sensor data in response to the data signal, to generate a frozen scene construction in response to the line and object quality and the uncertainty, to localize a host vehicle location with respect to the frozen scene construction, to regenerate an object data and a lane data in response to the frozen science and the localized host vehicle location, and to generate a vehicle motion path in response to the object data and lane data, and a vehicle controller for controlling the host vehicle in response to the vehicle motion path.

20 Claims, 4 Drawing Sheets

(52) U.S. Cl.
CPC ... *B60W 2420/408* (2024.01); *B60W 2554/20* (2020.02); *B60W 2556/00* (2020.02)

(58) Field of Classification Search
CPC .. G06V 10/96; G06V 10/993; G06V 2201/07; G06V 2201/08; G06V 20/70; G06V 20/60; G06V 20/80; G06V 20/40; G06V 20/44; G06V 20/588; G06V 20/584; G06V 20/58; G01C 21/30; G01C 21/3602; G01C 21/3815; G01C 21/3848; G08G 1/167; G06T 2207/30252
See application file for complete search history.

(56) References Cited

U.S. PATENT DOCUMENTS

| | | | |
|---|---|---|---|
| 2021/0224555 A1* | 7/2021 | Fent | G06V 20/56 |
| 2022/0398851 A1* | 12/2022 | Nehmadi | G01S 17/931 |
| 2023/0166743 A1* | 6/2023 | Heck | G05B 13/027 |
| 2023/0360375 A1* | 11/2023 | Kabzan | G06N 20/00 |
| 2024/0012702 A1* | 1/2024 | Wang | G06F 30/15 |
| 2024/0046409 A1* | 2/2024 | An | G06N 3/08 |
| 2025/0061601 A1* | 2/2025 | Arksey | G05D 1/104 |
| 2025/0078477 A1* | 3/2025 | Månsson | G06V 20/588 |
| 2025/0139838 A1* | 5/2025 | Couleaud | B60K 35/28 |

* cited by examiner

200

300

400

PREDICTIVE FROZEN SCENE FOR UNINTERRUPTED OPERATION OF AUTOMATED EVASIVE MANEUVER SYSTEMS

INTRODUCTION

The present disclosure relates generally to programming motor vehicle control systems. More specifically, aspects of this disclosure relate to systems, methods and devices to generate uninterrupted vehicle trajectories including evasive steering features despite temporary loss of sensor data due to fast lateral acceleration of the vehicle in an ADAS equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Adaptive cruise control systems have been developed where not only does the system maintain the set speed, but also will automatically slow the vehicle down in the event that a slower moving preceding vehicle is detected using various sensors, such as radar and cameras. Further, some vehicle systems attempt to maintain the vehicle near the center of a lane on the road. However, maintaining a lane speed on a rough road or roadways with other proximate hazards, such as construction barriers, could cause not only discomfort for vehicle occupants, but also, under some circumstances, the loss of vehicle control.

The conventional implementations of the active safety approaches have been anti-lock braking and traction control systems to help maintain vehicle stability by sensing road conditions and intervening in the vehicle brake and throttle control selections. However, automated driving systems may be helped further by complimenting such as evasive steering control system with strategies that intervene in vehicle control when hazards are detected within or close to the roadway. However, onboard vehicle sensors, especially cameras and radars, are prone to losing track of lanes/objects during evasive maneuvers. It would be desirable to address these problems to provide a method and apparatus for providing an evasive steering control system having a continuous stream of lane and object information during evasive maneuvers in an ADAS equipped motor vehicle. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are driver assistance vehicle control systems and methods and related control logic for provisioning vehicle driver assistance vehicle control systems, methods for making and methods for operating such systems, and motor vehicles equipped with driver assistance vehicle control systems. By way of example, and not limitation, there are presented various embodiments of systems for providing evasive steering control systems with continuous stream of lane and object information during evasive maneuvers in an ADAS equipped motor vehicle disclosed herein.

In accordance with an exemplary embodiment, a system for performing a vehicle maneuver algorithm including a sensor for generating a data signal indicative of an object location, a memory for storing an environment map indicative of a driving environment coordinated with a host vehicle location, a processor configured to estimate a line and object quality, to determine an uncertainty in response to historical motion of the objects, to detect a loss of sensor data in response to the data signal, to generate a frozen scene construction in response to the line and object quality and the uncertainty, to localize a host vehicle location with respect to the frozen scene construction, to regenerate an object data and a lane data in response to the frozen science and the localized host vehicle location, and to generate a vehicle motion path in response to the object data and lane data, and a vehicle controller for controlling the host vehicle in response to the vehicle motion path.

In accordance with another exemplary embodiment wherein the sensor is a vehicle mounted camera and wherein the object location is determined in response to an image recognition algorithm performed by an image processor.

In accordance with another exemplary embodiment wherein the vehicle maneuver algorithm is initiated in response to an acceleration detected by an inertial measurement unit exceeding a threshold value.

In accordance with another exemplary embodiment wherein the object data and the lane data are reconstructed in response to a vehicle telemetry data and an object reconstruction model.

In accordance with another exemplary embodiment wherein the object data and the lane data are reconstructed un response to an uncertainty characterization in response to a historical linear object behavior uncertainty.

In accordance with another exemplary embodiment wherein the frozen scene construction is predicted based on measurement model probabilities and covariances and a covariance adaption.

In accordance with another exemplary embodiment wherein the estimate of the line and object quality and the determination of the uncertainty are performed in response to a prediction of an upcoming evasive maneuver.

In accordance with another exemplary embodiment wherein the sensor is a LiDAR.

In accordance with another exemplary embodiment wherein the sensor is at least one of a radar, a LiDAR and a camera.

In accordance with another exemplary embodiment, a method for providing a vehicle maneuver including generating a data signal by a sensor indicative of an object location, storing, on a memory, an environment map indicative of a driving environment coordinated with a host vehicle location, determining, by the processor, a line and object quality, detecting, by a processor, a loss of sensor data in response to the data signal, determining an uncertainty in response to historical motion of the objects, generating, by the processor, a frozen scene construction in response to the line and object quality and the uncertainty, localizing, by the processor, a host vehicle location with respect to the frozen scene construction, regenerating, by the processor, an object data and a lane data in response to the frozen scene and the localized host vehicle location, generating, by the processor, a vehicle motion path in response to the object data and lane data, and controlling, by a vehicle controller, the host vehicle in response to the vehicle motion path.

In accordance with another exemplary embodiment wherein the sensor is a vehicle mounted camera and wherein the object location is determined in response to an image recognition algorithm performed by an image processor.

In accordance with another exemplary embodiment, further including generating a user alert indicative of a lane hazard in response to the vehicle speed reduction control signal.

In accordance with another exemplary embodiment wherein the object data and the lane data are reconstructed in response to a vehicle telemetry data and an object reconstruction model.

In accordance with another exemplary embodiment wherein the host lane speed reduction is determined in response to a user preference associated with the first hazard.

In accordance with another exemplary embodiment wherein the object data and the lane data are reconstructed un response to an uncertainty characterization in response to a historical linear object behavior uncertainty.

In accordance with another exemplary embodiment wherein the frozen scene construction is predicted based on measurement model probabilities and covariances and a covariance adaption.

In accordance with another exemplary embodiment wherein the vehicle maneuver algorithm is initiated in response to an acceleration detected by an inertial measurement unit exceeding a threshold value.

In accordance with another exemplary embodiment wherein the sensor is at least one of a radar, a LiDAR and a camera.

In accordance with another exemplary embodiment, a vehicle control system for performing an evasive steering maneuver algorithm including a camera for capturing an image of a field of view including an object within the field of view, a distance sensor to detecting a distance to the object, an inertial measurement unit for detecting an acceleration of a host vehicle, a processor configured to detect a loss of sensor data, invalid data, or frozen data in response to the data signal, to estimate a line and object quality in response to the acceleration of the host vehicle exceeding a threshold acceleration, to generate a frozen scene construction in response to the line and object quality, to localize a host vehicle location with respect to the frozen scene construction, to regenerate an object data and a lane data in response to the frozen science and the localized host vehicle location, and to generate a vehicle motion path in response to the object data and lane data, and a vehicle controller for controlling the host vehicle in response to the vehicle motion path.

In accordance with another exemplary embodiment wherein the object is a proximate vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
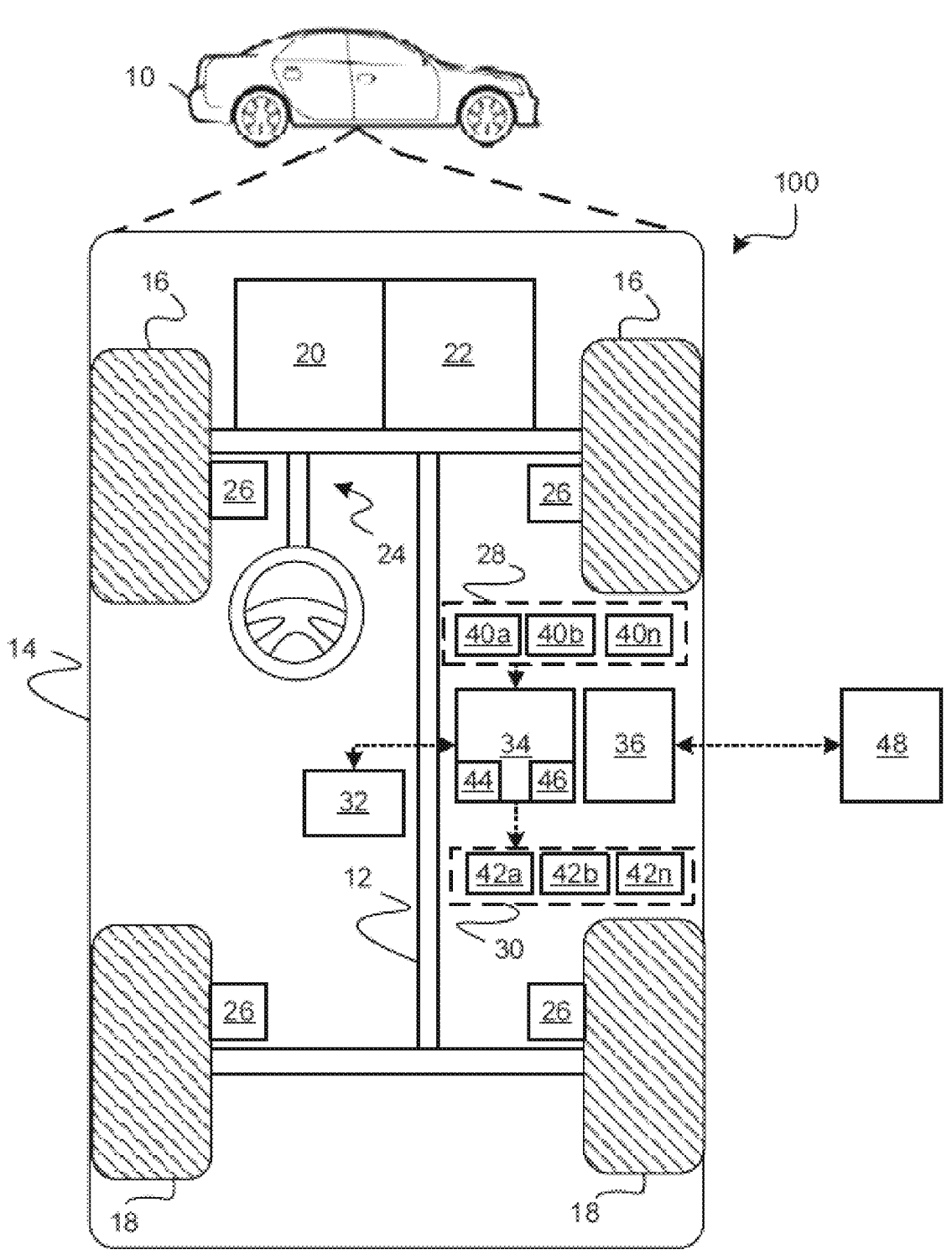
FIG. 1 is a functional block diagram illustrating an ADAS equipped motor vehicle in accordance with various embodiments for implementing a lane hazard mitigation strategy.

FIG. 1 is illustrative of an exemplary operating system 100 for implementing an evasive maneuver algorithm in an ADAS equipped motor vehicle 10, as described in greater detail further below in connection with the vehicle 10 of FIG. 1 as well as the environment 200 of FIG. 2 and the implementations of FIGS. 3 and 4.

In various embodiments, the vehicle 10 includes an automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 can be an ADAS equipped vehicle having an operating system 100 for implementing a lane hazard mitigation strategy incorporated into the vehicle 10 (hereinafter referred to as the vehicle 10). The vehicle 10 is, for example, a vehicle that can be automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is autonomous in that it provides partial or full automated assistance to a driver operating the vehicle 10. As used herein the term operator is inclusive of a driver of the vehicle 10 and/or an autonomous driving system of the vehicle 10.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
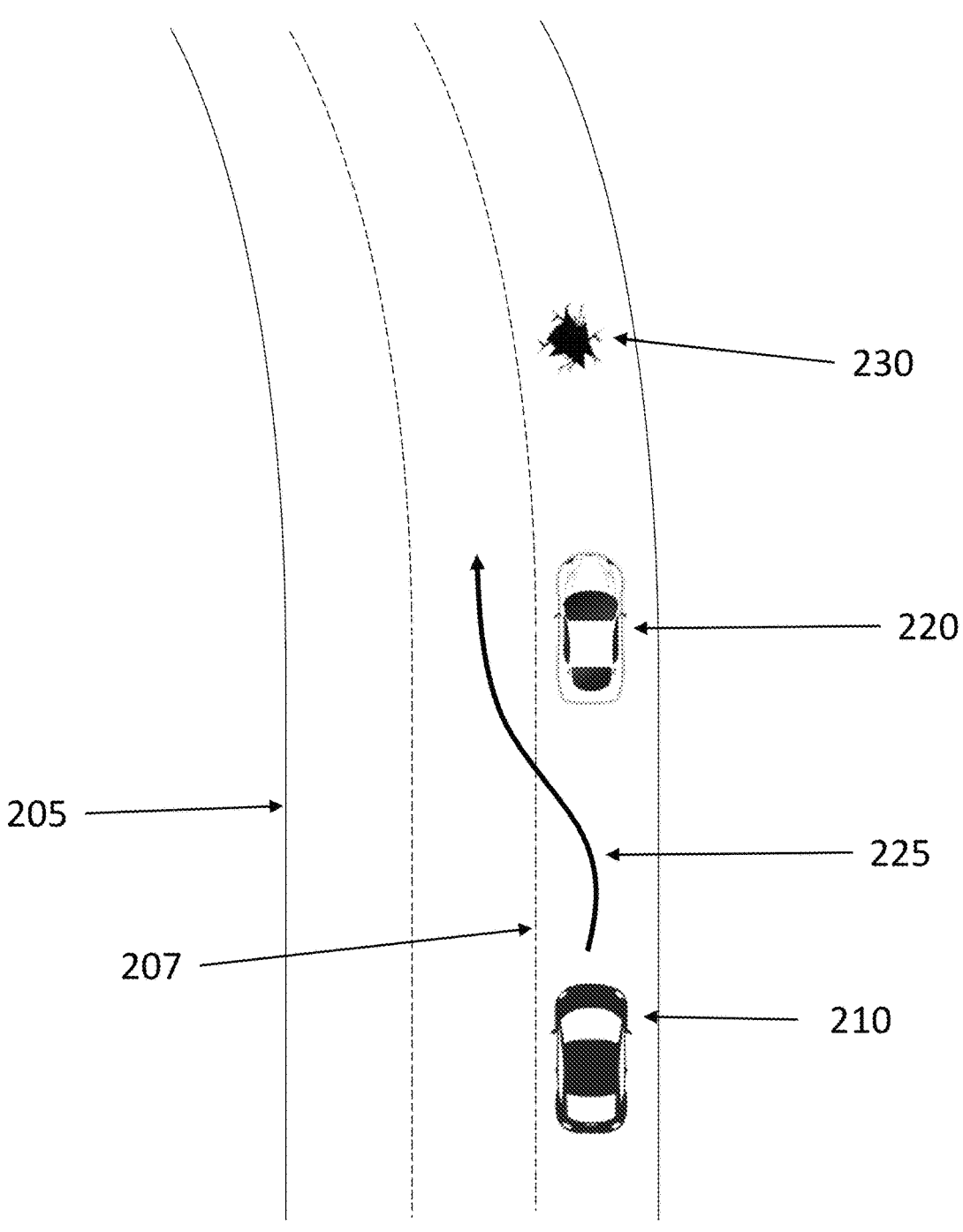
FIG. 2 is illustrative of an exemplary operating environment for implementing an evasive maneuver algorithm in an ADAS equipped motor vehicle according to an exemplary embodiment of the present disclosure.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate by communication messages over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the quality and safety assessing system 100 and, when executed by the processor 44, process sensor data from the sensing devices 40a-40n, message data from the communication medium and/or communication system 36, and/or data sent to or received from the actuator devices 42a-42n, and compute scores and explanations about the safety and driving quality of the operator of the vehicle 10.

Turning now to FIG. 2, an exemplary operating environment 200 for an automated evasive maneuver system in an ADAS equipped motor vehicle 210 is shown. In this exemplary embodiment of the present disclosure, the host vehicle 210 is driving on a multilane roadway 205 having various hazards such as a proximate vehicle 220 and potholes 230. A predictive evasive maneuver 225 is shown. In some exemplary embodiments, the host vehicle 210 is equipped with an ADAS feature such as adaptive cruise control and automatic lane centering. During assisted driving operation, the ADAS controller controls the throttle, the brakes and the steering of the host vehicle 210 to control the vehicle speed and vehicle position to keep the host vehicle 210 within the laneway. The ADAS controller can be configured to maintain a constant speed, to detect proximate objects, such as an approach to a slow preceding vehicle within the laneway, and to reduce a vehicle speed appropriately. Likewise, the ADAS controller can be configured to keep the host vehicle 210 centered in the current laneway and to perform evasive steering functions to control the steering of the host vehicle 210 position within the laneway in response to upcoming vehicles, detected hazards, such as debris or the like. When the ADAS is active, the ADAS can further perform the evasive steering control algorithm to improve safety by automatically maneuvering the host vehicle 210 to avoid obstacles and hazards.

Evasive steering control rapid response time is paramount for successful evasive maneuvers in the ADAS equipped host vehicle 210. Faster response times allow the system to identify a threat, assess the situation, and initiate evasive steering quicker, maximizing the available space to maneuver. Delays can significantly limit the ability of the host vehicle 210 and the evasive steering control algorithm to execute precise maneuvers. A quicker response translates to sharper turns and more accurate trajectory control, increasing the success rate of the evasive maneuver. By reacting promptly, the system can initiate corrective actions before the vehicle's dynamics are significantly upset by the impending collision, improving overall stability during the evasive maneuver.

Timely sensor data is critical to enable the host vehicle 210 and evasive steering control algorithm to execute precise evasive maneuvers in the quickest time possible. To maintain evasive steering functionality during brief sensor outages caused by rapid vehicle movements, the evasive steering algorithm and ADAS controller can employ a multi-step approach that prioritizes safety and maneuverability. First, upon encountering a temporary loss of sensor data, the evasive steering algorithm freezes the perceived environment. This creates a static snapshot of the surroundings based on the most recent sensor data received. Next, evasive steering algorithm leverages vehicle telemetry data, which tracks the vehicle's movement based on wheel rotations, to localize the host vehicle 210 within the previously detected lane markings 207 in order to maintain the host vehicle position within the lane even without real-time sensor updates. Finally, the algorithm employs a prediction model to anticipate the movement of surrounding objects on the road. This prediction considers safety margins, ensuring ample space is maintained between the ego vehicle and surrounding objects during the maneuver. By combining these steps, the algorithm enables uninterrupted trajectory generation and control. This allows the host vehicle 210 to complete evasive maneuvers effectively even with a temporary loss of sensor data, enhancing overall safety in critical situations.

Figure 3:
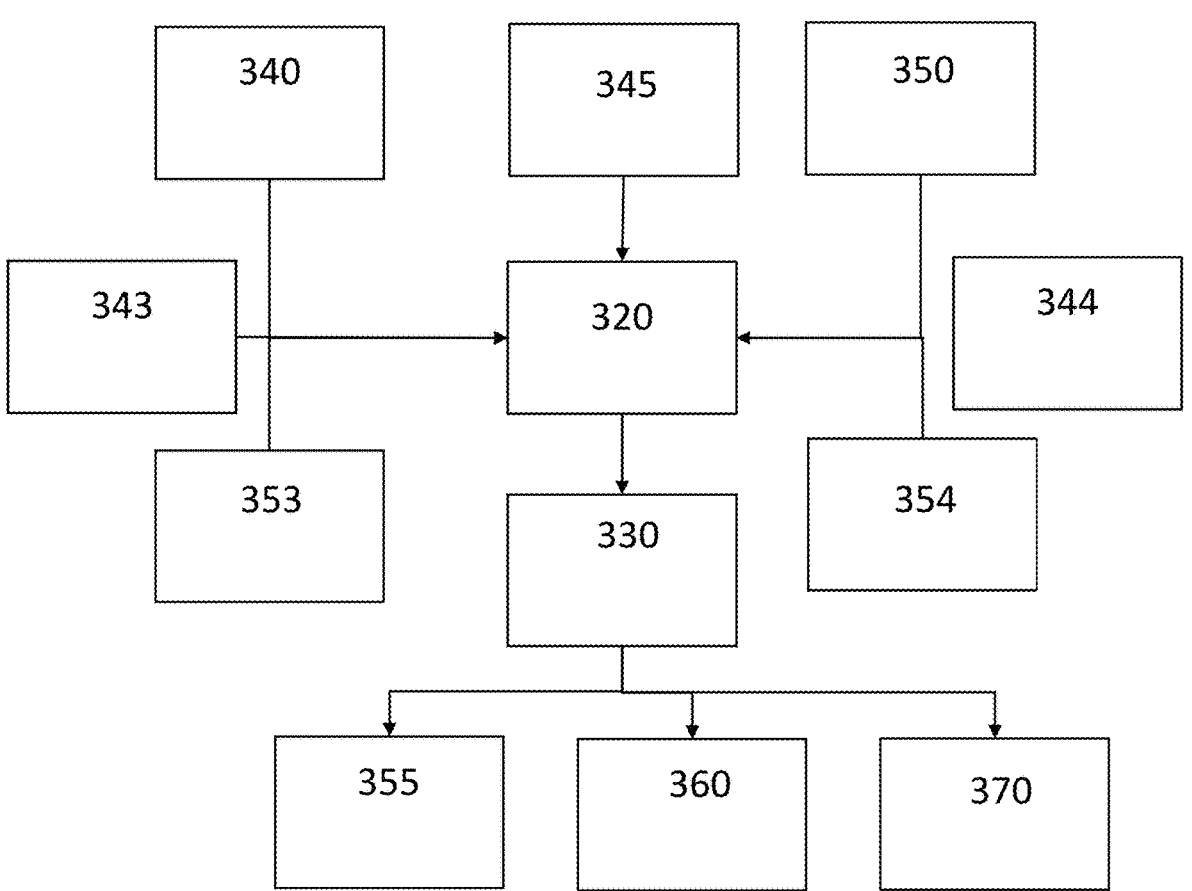
FIG. 3 shows a block diagram of an exemplary system for providing an evasive maneuver algorithm in an ADAS equipped motor vehicle according to an exemplary embodiment of the present disclosure.

Turning now to FIG. 3, a block diagram illustrating an exemplary implementation of a system 300 for performing an evasive steering maneuver in an ADAS equipped motor vehicle is shown. The exemplary system 300 can include a processor 320, a camera 340, LiDAR 343, radar 344, inertial measurement unit (IMU) 354 and GPS sensor 345. In addition, the processor 320 may receive stored information such as map data 350 from a memory 350 or the like, and user input via a user interface 353.

The camera 340 may be a low fidelity camera with a forward field of view (FOV). The camera 340 may be mounted inside the vehicle behind the rear view mirror or may be mounted on the front fascia of the vehicle. The camera 340 may use captured images and/or video which can be used to detect preceding and proximate vehicles, obstacles, lane markers, road surface edges, road surface characteristics, other roadway markings and road hazards during ADAS operation. Images captured by the camera 340 and data generated from the images may be used to augment map data stored in the memory 350.

The LiDAR 343 is configured to transmit pulses of light at a known elevation and azimuth and to measure a time interval between the transmission of the light pulse and a detected reflection of the light pulse. This time interval can be used to determine a distance to a surface at that known elevation and azimuth. The LiDAR 343 can then perform this ranging function over a plurality of sets of known azimuth and elevations to generate a detailed point cloud representation of the environment. The point cloud can be used to identify proximate objects based on their size and shape. This is particularly effective for static objects and larger dynamic objects. The radar 344 transmits radio waves and analyzes the reflected signals to determine the range, angle, and relative velocity of surrounding objects. The radar 344 can be used for range detection of leading vehicles for use by automatic emergency braking algorithms and can serve as a complementary sensor to the camera 340 and LiDAR 343 in building a comprehensive environment map for the ADAS processor 320.

The GPS sensor 345 can be a part of a global navigation satellite system (GNSS) to receive a plurality of time stamped satellite signals including the location data of a transmitting satellite. The GPS controller then uses this information to determine a precise location of the GPS sensor 345. The processor 320 may be operative to receive the location data from the GPS controller and store this location data to the memory 350. The memory 350 may be operative to store map data for use by the processor 320. The memory 350 may be further operative to store map data wherein the map data may be high definition map data including detailed representations of roadways including precise roadway locations, lane locations, curves, elevations, known lane hazards and other roadway details.

The processor 320 is configured to receive data from the various sensors and the user input and to generate an environment map centered on the host vehicle, The environment map includes positions of static objects, such as lane markers, light posts, stop signs and the like, as well as dynamic objects such as proximate vehicles, pedestrians, cyclists, etc. Typically, the processor 320 uses stored map data and sensor data to generate a comprehensive map of the static environment. The processor 320 then detects and tracks dynamic objects within the environment and adds this data to the environment map. LiDAR data can be used to provide precise distance information, allowing algorithms to identify objects based on their size and shape. This is particularly effective for static objects and larger dynamic objects. Image data captured by can be used to identify and classify objects like vehicles, pedestrians, and traffic signs. In addition, Kalman filters can be employed to track the movement of the dynamic objects over time by considering the dynamic object's position, velocity, and sensor noise, Kalman filters can be used predict the object's future location, smoothing out potential inconsistencies in sensor data. Sensor fusion algorithms combine data from the LiDAR 343, camera 340, radar 344, and other sensors to create a more robust and comprehensive environment map. This combined data can compensate for the limitations of individual sensors and momentary loss of data from one or more sensors, leading to more accurate object detection and tracking. The processor 320 is further configured to perform algorithms to detect and compensate for discrepancies between data from the various sensors as well as differences between real time sensor data and stored map data. Since the environment is constantly changing, the processor 320 continuously updates the environment map data in response to newly acquired sensor data.

The processor 320 is further operative to engage and control the ADAS in response to an initiation of the ADAS from a user via the user interface 353. In an ADAS operation, the processor 320 may be operative to generate a desired path in response to a user input or the like, wherein the desired path may include lane centering, curve following, lane changes, etc. This desired path information may be determined in response to the vehicle speed, the yaw angle and the lateral position of the vehicle within the lane. Once the desired path is determined, a control signal is generated by the processor 320 indicative of the desired path and is coupled to the vehicle controller 330. The vehicle controller 330 is operative to receive the control signal and to generate an individual steering control signal to couple to the steering controller 370, a braking control signal to couple to the brake controller 360 and a throttle control signal to couple to the throttle controller 355 in order to execute the desired path.

Like any vehicular systems, onboard vehicle sensors face some challenges that hinder their ability to perfectly perceive the environment, such as limitations on range and resolution, occlusions, environmental sensitivity, as well as mechanical and electrical interference issues. As a result of complex or cluttered environments or data fusion challenges, ADAS algorithms can lose track of lanes/objects. Safety critical operations, such as evasive steering control systems, require a continuous stream of lane and object information during operation. The processor 320 can perform various algorithms mitigate such sensor deficiencies and provides uninterrupted trajectory and control to perform an evasive maneuver steering algorithms during vehicle control over the desired path.

For example, in response to environmental map and sensor data, the processor 320 can initiate an evasive steering maneuver algorithm upon determination of an upcoming hazard situation. During performance of the evasive steering algorithm, the processor 320 may then detect a loss of sensor data. In response to the detected loss of sensor data, the processor 320 can perform a lane line and object quality estimation. The lane line and object quality estimation can use vehicle telemetry and predicted vehicle path as well as other data, such as tire limitations, to predict a lane quality based on a dynamic level of vehicle motion. The processor 320 can fuse lane and object quality to predict the scene degradation over a predicted horizon. The processor 320 then uses this lane line and object quality estimation to generate a frozen scene construction of the environment around the host vehicle. The processor 320 uses vehicle telemetry data to localize the host vehicle location within the frozen scene. In response to the frozen scene, the processor 320 regenerates object and lane data which is used to update the frozen scene construction and the localization of the host vehicle. In response to the regenerated object and lane data, the processor 320 then updates object detection and tracking for use by the evasive steering algorithm. The evasive steering algorithm can then adjust the vehicle motion path in response to the predicted object detection and tracking data.

In some exemplary embodiments, the processor 320 is configured to receive a stream of data from the various sensors, the vehicle controller 330 and the various user interfaces, such as the throttle controller 355, brake controller 360 and steering controller 370. In response to this data, the processor 320 can predict a possibility of an upcoming evasive maneuver. For example, the processor 320 can consider factors such as the position, speed, and direction of the host vehicle and surrounding static and dynamic objects to calculate a probability of high risk conditions. Advanced systems can use machine learning to analyze vast amounts of traffic data to identify risky situations and pedestrian behavior patterns.

In response to the prediction of a possible upcoming occurrence of an evasive maneuver, the processor 320 can begin building an environment map to track static and dynamic objects proximate to the host vehicle, such as lane markers, and to localize the host vehicle within the environment map. In the instance of sensor data loss during an evasive maneuver, the processor 320 can freeze the environment map, estimate locations of dynamic objects in response to prior tracking data and can estimate the vehicle location within the environment in response to other vehicle telemetry data or the like. Lane geometry can be estimated using a recursive least square method using third order polynomial coefficients. For example, a lane polynomial from a captured image at a time k for lane j is given by:

$$y_{i,j}(x_{i,j}) = C_{0,j}\,|_k + C_{i,j}\,|_k\,x_{i,j} + C_{2,j}\,|_k\,x_{i,j}^2 + C_{3,j}\,|_k\,x_{i,j}^3$$

Where the unknown lane polynomial at time k+t is given by:

$$\left[\overrightarrow{R_H^{P_{i,j}}}\,|_{k+t}\right]_y = +C_{0,j}\,|_{k+t} + C_{1,j}\,|_{k+t}\left[\overrightarrow{R_H^{P_{i,j}}}\,|_{k+t}\right]_x + C_{2,j}\,|_{k+t}\left[\overrightarrow{R_H^{P_{i,j}}}\,|_{k+t}\right]_x^2 + \\ C_{3,j}\,|_{k+t}\left[\overrightarrow{R_H^{P_{i,j}}}\,|_{k+t}\right]_x^3$$

The recursive least squares reconstruction of lane coefficients at time k=t (when the image data has been interrupted is then given by:

$$[\hat{C}_{0,j}\,|_{k+t} \quad \hat{C}_{1,j}\,|_{k+t} \quad \hat{C}_{2,j}\,|_{k+t} \quad \hat{C}_{3,j}\,|_{k+t}] = \begin{bmatrix} \left[\overrightarrow{R_H^{P_{0,j}}}\,|_{k+t}\right]_y \\ \left[\overrightarrow{R_H^{P_{1,j}}}\,|_{k+t}\right]_y \\ \vdots \\ \left[\overrightarrow{R_H^{P_{n,j}}}\,|_{k+t}\right]_y \end{bmatrix} \backslash$$

$$\begin{bmatrix} 1 & 1 & \cdots & 1 \\ \left[\overrightarrow{R_H^{P_{0,j}}}\,|_{k+t}\right]_x & \left[\overrightarrow{R_H^{P_{1,j}}}\,|_{k+t}\right]_x & \cdots & \left[\overrightarrow{R_H^{P_{n,j}}}\,|_{k+t}\right]_x \\ \left[\overrightarrow{R_H^{P_{0,j}}}\,|_{k+t}\right]_x^2 & \left[\overrightarrow{R_H^{P_{1,j}}}\,|_{k+t}\right]_x^2 & \cdots & \left[\overrightarrow{R_H^{P_{n,j}}}\,|_{k+t}\right]_x^2 \\ \left[\overrightarrow{R_H^{P_{0,j}}}\,|_{k+t}\right]_x^3 & \left[\overrightarrow{R_H^{P_{1,j}}}\,|_{k+t}\right]_x^3 & \cdots & \left[\overrightarrow{R_H^{P_{n,j}}}\,|_{k+t}\right]_x^3 \end{bmatrix}$$

In the case of an assisted driving algorithm, the processor 320 can then generate a motion path in response to the frozen environment map. If there is no current data, the processor 320 can use the frozen environment and dead reckoning to generate the motion path. Dead reckoning involves using a known starting point, directional or compass headings, estimated speed, and elapsed time to calculate a current position. In addition, the processor 320 can further calculate a safety zone around dynamic objects in response to the relative kinematics of the dynamic object. For example, if the relative kinematics of the dynamic object are greater, such as a higher nonlinear object behavior, a larger bounded uncertainty can be approximated compared to that of a dynamic object having a historically linear behavior. The relative kinematics of the target with respect to the host during the automated evasive steering maneuver is given by:

$$\vec{R_H^T}\,|_{k+t} = \vec{R_H^T}\,|_k + \vec{R_T^T}\,|_{k+t} - \vec{R_H^H}\,|_{k+t}$$

where $R^T_H$ at k+t is the unknown, where the camera and radar cannot reliably detect the dynamic object at time k+t due to the evasive maneuver host motion, $R^T_H$ at k is data sensed by the camera and radar at time k, $R^T_T$ at k+t is the unknown (bounded uncertainty) and $R^H_H$ at k+t is determined from the host vehicle telemetry between time k and time k+t.

Relative target kinematics can be approximated by linear propagation of states at time k+t, plus a bounded uncertainty:

$$\vec{R_T^T}\,|_{k+t} = \vec{R_T}\,|_k + \vec{V_T}\,|_k \cdot t + \vec{\Delta R_T}\,|_{k+t}$$

Therefore, the relative position of the dynamic object when the sensors stopped detecting the object can be characterized as:

$$\vec{R_H^T}\,|_{k+t} = \vec{R_H^T}\,|_k - \vec{R_H^H}\,|_{k+t} + \vec{R_T}\,|_k + \vec{V_T}\,|_k + \vec{\Delta R} = f\Big(\vec{R_H^T}\,|_k, \vec{R_H^H}\,|_{k+t},$$
$$\vec{R_T}\,|_k, \vec{V_T}\,|_k, \vec{\Delta R}\Big)$$

Similarly, velocity and acceleration can be characterized as:

$$\vec{R_H^T}\,|_{k+t} = f\Big(\vec{R_H^T}\,|_k, \vec{R_H^H}\,|_{k+t}, \vec{R_T}\,|_k, \vec{V_T}\,|_k, \vec{\Delta R}\Big)$$
$$\vec{V_H^T}\,|_{k+t} = f\Big(\vec{V_H^T}\,|_k, \vec{V_H^H}\,|_{k+t}, \vec{\omega_H}\,|_k, \vec{V_T}\,|_k, \vec{A_T}\,|_k, \vec{\omega_T}\,|_k, \vec{\Delta V}\Big)$$
$$\vec{A_H^T}\,|_{k+t} = f\Big(\vec{A_H^T}\,|_k, \vec{A_H^H}\,|_{k+t}, \vec{\omega_H}\,|_k, \vec{\alpha_H}\,|_k, \vec{V_T}\,|_k, \vec{A_T}\,|_k, \vec{\omega_T}\,|_k, \vec{\alpha_H}\,|_k,$$
$$\vec{\Delta A}\Big)$$

The Kalman prediction can be augmented with host dynamics and characterized uncertainties as is provided by:

$$\hat{z}_{k+1|k} = A\hat{z}_{k|k} + \Delta K$$
$$\Delta K = f\Big(\vec{R_H^T}\,|_{k+t}, \vec{V_H^T}\,|_{k+t}, \vec{A_H^T}\,|_{k+t}, \vec{\Delta R}, \vec{\Delta V}, \vec{\Delta A}\Big)$$
$$P_{k+1|k} = AP_{k|k}A^T + BQB^T$$

Figure 4:
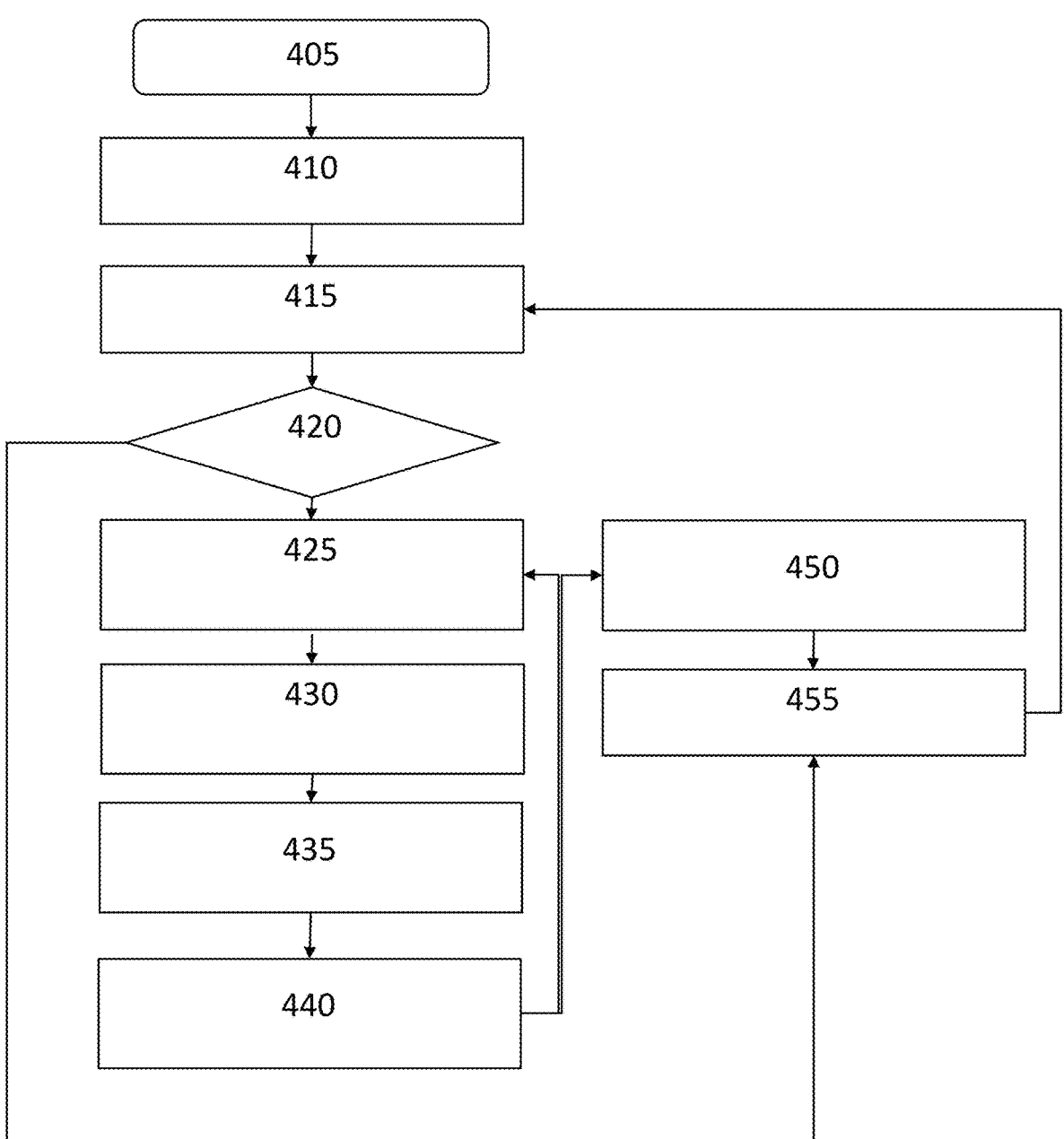
FIG. 4 shows a flow chart illustrating a method for providing an evasive maneuver algorithm in an ADAS equipped motor vehicle according to an exemplary embodiment of the present disclosure.

Turning now to FIG. 4, a flow chart illustrating an exemplary implementation of a method 400 for generating a predicted frozen scene for uninterrupted operation of an automated evasive maneuvering system in an ADAS equipped motor vehicle is shown. The proposed method 400 is operative to provide for continued operation of evasive steering features despite temporary loss of sensor data due to the fast lateral dynamics of the host vehicle. The method 400 freezes the scene when the sensor information is lost, localizes the host vehicle against the historically detected lane lines based on odometry, predicts the surround actor dynamics considering safety margins, and enables an uninterrupted trajectory generation as well as control performance in evasive maneuvers.

The method 400 is first operative to initiate 405 the evasive steering maneuver algorithm. In response to initiation of the evasive steering maneuver algorithm, the method 400 can generate 410 a vehicle motion path in response to environment map data as well as detected static and dynamic proximate object locations and tracking. The method 400 can receive data from a plurality of sensors and generate an environment map representative of the environment around the host vehicle. The motion planning algorithm then executes a path planning algorithm that considers the received sensor data, including information on static elements like lane markings and dynamic objects like other vehicle, and additional parameters such as traffic regulations and safety margins to generate a feasible trajectory. The motion path is then refined by the motion planning algorithm that ensures the trajectory is kinematically achievable by the host vehicle, considering its acceleration, braking, and turning capabilities.

In response to the generated vehicle motion path, the method 400 can then controls 415 the host vehicle along the motion path. The method 400 can employ a refined control signal generation method by calculating a lateral error, the distance between the vehicle and the intended path. A trajectory optimization module refines the planned trajectory based on the lateral error and factors like upcoming turns or obstacles detected by the sensors. The method can employ a model predictive control strategy to anticipates future situations and generates control signals and a dynamic model that incorporates vehicle dynamics, road conditions, and weather data. The generated control signals are then translated into specific electronic instructions for steering, acceleration, and braking. These electronic signals can be to a vehicle control unit which acts as an interface between the ADAS controller and the host vehicle brake, throttle, and steering controllers. The vehicle controller can translate the received signals into commands for individual components: the electric power steering system adjusts the steering angle, the Engine Control Unit (ECU) modulates engine power, and the Anti-lock Braking System (ABS) and Electronic Brakeforce Distribution (EBD) work in concert to control individual wheel brakes.

The method next determines if a loss of sensor data has been detected 420. In some exemplary embodiments, the method 400 can employ a sensor health monitoring module integrated within the processing unit. The sensor health monitoring module receives raw data streams from each sensor within the sensor suite. It then performs a multi-pronged analysis to identify potential sensor malfunctions or data loss events. The sensor health monitoring module can perform data validity checks to verify if the received data adheres to pre-defined parameters for each sensor type. For instance, it might check for implausible values or data ranges that deviate significantly from normal operation. Temporal consistency checks can be performed to analyze the temporal consistency of incoming data. Unexpected delays, sudden drops in data frequency, or inconsistencies between timestamps from different sensors can indicate potential issues. Sensor redundancy checks can be performed on data from different sensors to compare their outputs for consistency. Significant discrepancies might suggest a malfunction in one of the sensors.

If no loss of sensor data has been detected 420, the method generates 455 an updated motion path in response to the received sensor data and continues to follow 415 the updated motion path. If a loss of sensor data has been detected 420 during performance of the evasive steering algorithm, the method 400 can perform a lane line and object quality estimation 425. The lane line and object quality estimation can use vehicle telemetry and predicted vehicle path as well as other data, such as tire limitations, to predict a lane quality based on a dynamic level of vehicle motion. The method 400 can fuse lane and object quality to predict the scene degradation over a predicted horizon.

The method 400 then uses this lane line and object quality estimation to generate 430 a frozen scene construction of the environment around the host vehicle.

The method 400 uses vehicle telemetry data to localize 435 the host vehicle location within the frozen scene. The frozen scene concept reconstructs the missing lane/object information and provides a continuous stream of data for evasive steering features.

In response to the frozen scene, the method 400 regenerates 440 object and lane data which is used to update the frozen scene construction and the localization of the host vehicle. In some exemplary embodiments, the method 400 can localize lane information with respect to the host vehicle when the sensory lane data is interrupted using host odometry, historical camera data and recursive estimation. In some exemplary embodiments, the object reconstruction can employ vehicle telemetry data with an object reconstructor model. The object reconstructor model characterizes a level of uncertainty of the object to be avoided. An augmented Kalman model can be initialized, a prediction and state propagation model generated, such as slow target dynamics or high host dynamics, a covariance adaption generated, such as armed, reconstructed or partial update, a prediction updated generated based on mode probabilities and covariances, and finally the estimated convergence can be checked. In response a reconstructed object relative position, velocity and heading can be generated and incorporated into the updated environment map.

For example, lane lines can be localized in the frozen scene in response to loss of lane information due to the evasive maneuver. The method 400 can use a historical buffer of lane information and host vehicle telemetry data, such as steering angle, IMU data, host vehicle velocities, GPS position data and wheel speeds as inputs. The method 400 can generate a lane polynomial from camera images and perform a recursive least squares reconstruction of the lane coefficients. The relative kinematics of the object with respect to the host vehicle during the maneuver are approximated by linear propagation of states at an interval of time plus a bounded uncertainty. The maximum uncertainty bound can be designed as a function of target behavior over previous sample times. The method 400 can further include an augmentation of a Kalman filter prediction with ego dynamics based on a trigger indicating an onset of an evasive steering maneuver plus the characterized uncertainties when sensors data is lost.

In response to the regenerated object and lane data, the method 400 then updates 450 object detection and tracking for use by the evasive steering algorithm. This updated object detection can also construct a safety margin to ensure safe operation of the ego vehicle in evasive maneuvers. In some exemplary embodiments, an uncertainty band is computed based on the historical object motion and is updated using sporadic sensor measurements. The method 400 can perform the object tracking in the host vehicle coordinate frame during highly dynamic maneuvers in an augmented filter, such as a Kalman filter, to leverage reconstructed object data in combination with host motion's odometry.

The evasive steering algorithm can then update 455 the vehicle motion path in response to the predicted object detection and tracking data. In response to the updated motion path, the method 400 can then control the host vehicle to follow 415 the updated motion path.

It will be appreciated that the systems, vehicles, and methods may vary from those depicted in the Figures and described herein. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for performing a vehicle maneuver comprising:

a sensor set to generate a data signal indicative of an object location and a lane line location;

a memory having instructions stored thereon; and a processor coupled to the memory and the sensor set, the processor to execute the instructions to:

determine a lane line quality and an object quality;

detect a loss of sensor data from the sensor set;

estimate a lane line and object quality, determine an uncertainty in response to historical motion of the objects, generate a frozen scene construction in response to the lane line and object quality and the uncertainty, localize a host vehicle location with respect to the frozen scene construction using an environment map stored in the memory, regenerate an object data and a lane data in response to the frozen scene and the localized host vehicle location, and generate a vehicle motion path in response to the regenerated object data and lane data; and a vehicle controller in communication with the processor, the vehicle controller to control the host vehicle in response to the vehicle motion path.

2. The system for performing the vehicle maneuver of claim 1 wherein the sensor set includes a vehicle mounted camera and wherein the object location is determined in response to an image recognition algorithm performed by an image processor.

3. The system for performing the vehicle maneuver of claim 1 wherein the vehicle maneuver algorithm is initiated in response to an acceleration detected by an inertial measurement unit exceeding a threshold value.

4. The system for performing the vehicle maneuver of claim 1 wherein the object data and the lane data are reconstructed in response to a vehicle telemetry data and an object reconstruction model.

5. The system for performing the vehicle maneuver of claim 1 wherein the object data and the lane data are reconstructed un response to an uncertainty characterization in response to a historical linear object behavior uncertainty.

6. The system for performing the vehicle maneuver of claim 1 wherein the frozen scene construction is predicted based on measurement model probabilities and covariances and a covariance adaption.

7. The system for performing the vehicle maneuver of claim 1 wherein the estimate of the line and object quality and the determination of the uncertainty are performed in response to a prediction of an upcoming evasive maneuver.

8. The system for performing the vehicle maneuver of claim 1 wherein the set includes a LiDAR.

9. The system for performing the vehicle maneuver of claim 1 wherein the set includes a radar, a LiDAR and a camera.

10. A method for providing a vehicle maneuver comprising:

generating a data signal by a sensor set indicative of an object location and a lane line location;

storing, on a memory, an environment map indicative of a driving environment coordinated with a host vehicle location;

determining, by a processor, a lane line quality and an object quality;

detecting, by the processor, a loss of sensor data in response to the data signal;

determining an uncertainty in response to historical motion of the objects;

generating, by the processor, a frozen scene construction in response to the lane line quality, the object quality and the uncertainty;

localizing, by the processor, a host vehicle location with respect to the frozen scene construction;

regenerating, by the processor, an object data and a lane data in response to the frozen scene and the localized host vehicle location;

generating, by the processor, a vehicle motion path in response to the object data and lane data; and controlling, by a vehicle controller, the host vehicle in response to the vehicle motion path.

11. The method for providing the vehicle maneuver of claim 10 wherein the sensor set includes a vehicle mounted camera and wherein the object location is determined in response to an image recognition algorithm performed by an image processor.

12. The method for providing the vehicle maneuver of claim 10 further including generating a user alert indicative of a lane hazard in response to the vehicle speed reduction control signal.

13. The method for providing the vehicle maneuver of claim 10 wherein the object data and the lane data are reconstructed in response to a vehicle telemetry data and an object reconstruction model.

14. The method for providing the vehicle maneuver of claim 10 wherein the host lane speed reduction is determined in response to a user preference associated with the first hazard.

15. The method for providing the vehicle maneuver of claim 10 wherein the object data and the lane data are reconstructed un response to an uncertainty characterization in response to a historical linear object behavior uncertainty.

16. The method for providing the vehicle maneuver of claim 10 wherein the frozen scene construction is predicted based on measurement model probabilities and covariances and a covariance adaption.

17. The method for providing the vehicle maneuver of claim 10 wherein the vehicle maneuver algorithm is initiated in response to an acceleration detected by an inertial measurement unit exceeding a threshold value.

18. The method for providing the vehicle maneuver of claim 10 wherein the set includes at least one of a radar, a LiDAR and a camera.

19. A vehicle control system for performing an evasive steering maneuver comprising:

a camera to capturing an image of a field of view including an object within the field of view;

a distance sensor to detect a distance to the object;

an inertial measurement unit (IMU) to detect an acceleration of a host vehicle;

a memory having instructions stored thereon;

a processor coupled to the camera, the distance sensor, the IMU, and the memory, the processor to execute the instructions to:

detect a loss of sensor data signal from at least one of the camera and the distance sensor;

determine a lane line quality and an object quality in response to the acceleration of the host vehicle exceeding a threshold acceleration;

generate a frozen scene construction in response to the lane line quality, the object quality, and an uncertainty based on historical motion of the object;

localize a host vehicle location with respect to the frozen scene construction;

regenerate an object data and a lane data in response to the frozen scene and the localized host vehicle location; and generate a vehicle motion path for an evasive steering maneuver in response to the regenerated object data and lane data; and a vehicle controller to control the host vehicle along the vehicle motion path in response in response to the vehicle motion path.

20. The vehicle control system for performing the evasive steering maneuver algorithm of claim 19, wherein the object is a proximate vehicle.

\* \* \* \* \*